United States Patent
Kobayashi et al.

(10) Patent No.: US 8,641,204 B2
(45) Date of Patent: Feb. 4, 2014

(54) PROJECTOR AND METHOD FOR REGISTRATION ADJUSTMENT

(75) Inventors: Makoto Kobayashi, Matsumoto (JP); Takaaki Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 13/276,377

(22) Filed: Oct. 19, 2011

(65) Prior Publication Data

US 2012/0098853 A1    Apr. 26, 2012

(30) Foreign Application Priority Data

Oct. 22, 2010   (JP) ................................ 2010-237155

(51) Int. Cl.
*G03B 21/14*    (2006.01)

(52) U.S. Cl.
USPC .......................................................... 353/69

(58) Field of Classification Search
USPC .......................................................... 353/69
See application file for complete search history.

(56) References Cited

U.S. PATENT DOCUMENTS

| 2008/0062274 | A1* | 3/2008 | Hamamura | ................ | 348/223.1 |
| 2009/0027567 | A1 | 1/2009 | Nishimura et al. | | |
| 2009/0027568 | A1 | 1/2009 | Nishimura et al. | | |
| 2009/0027569 | A1 | 1/2009 | Nishimura et al. | | |

FOREIGN PATENT DOCUMENTS

| JP | 8-201937 A | 8/1996 |
| JP | 11-218841 A | 8/1999 |
| JP | 2003-295310 A | 10/2003 |
| JP | 2009-014747 A | 1/2009 |
| JP | 2009-031441 A | 2/2009 |
| JP | 2009-031442 A | 2/2009 |
| JP | 2009-031443 A | 2/2009 |
| JP | 2009-033364 A | 2/2009 |
| JP | 2009-33364 A | 2/2009 |
| JP | 2009-033365 A | 2/2009 |

* cited by examiner

*Primary Examiner* — Thanh Luu
*Assistant Examiner* — Renee Naphas
(74) *Attorney, Agent, or Firm* — ALG Intellectual Property, LLC

(57) ABSTRACT

A projector including: a light source; a light modulation device modulating a light emitted from the light source in accordance with an image signal for each of colored lights for color display; a projection optical system projecting each of the colored lights modulated by the light modulation device; an operation accepting section; a registration adjustment section performing correction of the image signal corresponding to each of the colored lights based on an operation accepted by the operation accepting section so that a displacement occurring in at least one of a horizontal direction and a vertical direction in a projection screen between the colored lights is reduced, and supply the light modulation device with the image signal corrected if the displacement occurs; and a correction direction display control section displaying a correction direction, in which the correction of the image signal is performed, as an icon indicating a direction.

8 Claims, 11 Drawing Sheets

N1

[INSTALLATION MODE SETTING]

PLEASE SET INSTALLATION POSTURE OF PROJECTOR.

FRONT-NORMAL INSTALLATION
FRONT-CEILING MOUNT
REAR-NORMAL INSTALLATION
REAR-CEILING MOUNT

SELECT WITH CURSOR KEY, DETERMINE WITH DECISION KEY.

FIG. 2

REAR-NORMAL INSTALLATION

REAR-CEILING MOUNT

PROJECTOR AND METHOD FOR REGISTRATION ADJUSTMENT

CROSS-REFERENCE

The present application claims priority from Japanese Patent Application No. 2010-237155 filed on Oct. 22, 2010, which is hereby incorporated by reference in its entirety.

BACKGROUND

In the past, there has been known a liquid crystal projector which combines three colored lights of red light, green light, and blue light with each other to thereby perform projection. In such a projector, a variation in, for example, accuracy of positioning of the optical system occurs in some cases. Further, if the variation occurs, color shift in the image projected on a screen occurs in some cases due to the displacement between the colored lights. There has been proposed a projector provided with a registration adjustment function for electrically correcting the color shift in order for reducing such color shift (e.g., Japanese Patent Publication No. 8-201937).

Incidentally, projectors are utilized in a variety of places such as companies, event sites, schools, or homes. As an installation posture of the projector in such places, there can be cited a posture for being mounted on the desk or the like to perform projection on a screen, a posture in which the projector is fixedly mounted upside down by being suspended from an overhead location such as a ceiling to perform projection, a posture in which the projector is installed behind the screen to perform projection, and so on. For example, since the image projected in the ceiling mount posture is displayed in an orientation (an orientation rotated 180°) flipped vertically and horizontally with respect to the case of projection performed in the normal posture, the user sets an image conversion function for flipping the projection image provided to the projector to thereby flip the orientation of the image projected from the projector to the orientation corresponding to the installation condition (posture).

Here, even in the case in which such an image conversion function is performed, the direction of the color shift due to the displacement between the colored lights described above does not change from before the image conversion is performed because the color shift depends on the hardware (the optical mechanism). Therefore, there arises a problem that when the user performs the registration adjustment, the correction direction (the adjustment direction) on the registration adjustment screen and the actual correction direction become different to thereby degrade the operability in performing the registration adjustment.

SUMMARY

Various embodiments may solve at least a part of the problems described above, and the invention can be implemented as the following forms or application examples.

APPLICATION EXAMPLE 1

According to at least one embodiment of the disclosure, there is provided a projector including a light source, a light modulation device configured to modulate a light emitted from the light source in accordance with an image signal for each of colored lights for color display, a projection optical system configured to project each of the colored lights modulated by the light modulation device, an operation accepting section configured to accept an operation, a registration adjustment section configured to perform correction of the image signal corresponding to each of the colored lights based on the operation accepted by the operation accepting section so that a displacement occurring in at least one of a horizontal direction and a vertical direction in a projection screen between the colored lights is reduced, and supply the light modulation device with the image signal corrected if the displacement occurs, and a correction direction display control section configured to display a correction direction, in which the correction of the image signal by the registration adjustment section is performed, in the projection screen as an icon indicating a direction.

According to such a projector, the registration adjustment section performs the correction of the image signal based on the operation by the user so that the displacement occurring in at least one of the horizontal direction and the vertical direction in the projection screen between the colored lights for the color display is reduced if the displacement occurs. The correction direction display control section displays the correction direction in which the correction is performed in the projection screen as the icon indicating the direction. Thus, the correction direction is displayed in the projection screen using the icon irrespective of the installation condition of the projector. Therefore, the correction direction of the projection screen viewed from the user and the actual correction direction coincide with each other even in the case in which the orientation of the image projected from the projector is flipped to the orientation corresponding to the installation condition (posture). Therefore, the operability can be prevented from being degraded when performing the registration adjustment.

APPLICATION EXAMPLE 2

According to at least one embodiment of the disclosure, there is provided the projector of the above embodiment, which further includes an installation posture storage section configured to store, as installation posture information of a main body of the projector, information of either one of a front projection posture of performing projection from a front side, from which the projection screen is viewed, to a screen and a rear projection posture of performing projection from a rear side opposite to the front side to the screen, and information of either one of a normal installation posture corresponding to a predetermined basic posture of installation and a ceiling mount posture with upside down, and the correction direction display control section reverses the direction indicated by the icon in a horizontal direction and a vertical direction if the installation posture information stored in the installation posture storage section corresponds to the front projection posture and the ceiling mount posture, reverses the direction indicated by the icon in the horizontal direction if the installation posture information corresponds to the rear projection posture and the normal installation posture, and reverses the direction indicated by the icon in the vertical direction if the installation posture information corresponds to the rear projection posture and the ceiling mount posture.

According to such a projector, the installation information storage section stores the installation posture information of the main body of the projector. Further, the correction direction display control section reverses the direction indicated by the icon in the horizontal direction or the vertical direction based on the installation posture information. Thus, the correction direction is displayed in the projection screen using the icon irrespective of the installation condition (posture) of the projector.

APPLICATION EXAMPLE 3

According to at least one embodiment of the disclosure, there is provided the projector of the above embodiment, wherein a color of the icon indicating the correction direction displayed by the correction direction display control section is a color corresponding to a color represented by the image signal on which the correction is performed.

According to such a projector, it becomes possible to identify the colored light on which the displacement correction (the registration adjustment) is performed using the color of the icon.

APPLICATION EXAMPLE 4

According to at least one embodiment of the disclosure, there is provided the projector of the above embodiment, which further includes a maximum correction amount storage section configured to store a maximum correction amount as a largest correction amount by the registration adjustment section, and the correction direction display section changes the color of the icon to a predetermined color if the correction amount by the registration adjustment section becomes the maximum correction amount.

According to such a projector, the correction direction display control section changes the color of the icon to the predetermined color if the correction amount by the registration adjustment section becomes the maximum. Thus, it becomes possible for the user to recognize that the maximum correction amount is reached.

APPLICATION EXAMPLE 5

According to at least one embodiment of the disclosure, there is provided the projector of the above embodiment, which further includes a correction amount display control section configured to display the correction amount by the registration adjustment section and the maximum correction amount in the projection screen with a numerical character.

According to such a projector, the user can compare the correction amount and the maximum correction amount with each other using numerical characters when performing the registration adjustment. Therefore, it is possible for the user to figure out the degree of the present correction amount.

APPLICATION EXAMPLE 6

According to at least one embodiment of the disclosure, there is provided the projector of the above embodiment, wherein the correction direction display control section separates the icon by painting with a color corresponding to the color represented by the image signal on which the correction is performed and an other color in accordance with a ratio between the correction amount and the maximum correction amount.

According to such a projector, the user can compare the correction amount and the maximum correction amount with each other based on the state of separation by painting with the colors in the icon when performing the registration adjustment. Therefore, it is possible for the user to easily figure out the degree of the present correction amount.

APPLICATION EXAMPLE 7

According to at least one embodiment of the disclosure, there is provided a method of controlling a projector including: providing a light source, a light modulation device configured to modulate a light emitted from the light source in accordance with an image signal for each of colored lights for color display, a projection optical system configured to project the colored lights modulated by the light modulation device, and an operation accepting section configured to accept an operation to the projector, adjusting registration by performing correction of the image signal corresponding to each of the colored lights based on the operation accepted by the operation accepting section so that a displacement occurring in at least one of a horizontal direction and a vertical direction in a projection screen between the colored lights is reduced, and supplying the light modulation device with the image signal corrected if the displacement occurs, and displaying a correction direction, in which the correction of the image signal is performed in the adjusting, in the projection screen as an icon indicating a direction.

According to such a method of controlling a projector, the correction direction is displayed in the projection screen using the icon irrespective of the installation condition of the projector. Therefore, the correction direction of the projection screen viewed from the user and the actual correction direction coincide with each other even in the case in which the orientation of the image projected from the projector is flipped to the orientation corresponding to the installation condition (posture). Therefore, the operability can be prevented from being degraded when performing the registration adjustment.

Further, in the case in which the projector and the method of controlling a projector described above are configured using the computer provided to the projector, the application examples of the invention described above can be configured as a form such as a computer program for realizing the function, or a recording medium recording the computer program in a computer readable manner. As such a recording medium, there can be used various media which can be read by the computer described above such as a flexible disk, a hard disk, a compact disk read only memory (CD-ROM), a digital versatile disk (DVD), a Blu-ray disc (registered trademark), a magneto optical disk, a nonvolatile memory card, an internal storage (a semiconductor memory such as a random access memory (RAM) or a read only memory (ROM)) of the projector, or an external storage (e.g., a universal serial bus (USB) memory).

BRIEF DESCRIPTION OF THE DRAWINGS

Non-limiting and non-exhaustive embodiments of the present disclosure will be described with reference to the accompanying drawings, wherein like reference numbers reference like elements.

FIG. 2 is an explanatory diagram of an installation mode setting menu screen.

FIGS. 3A and 3B are explanatory diagrams in the case of installing the projector in front of the screen, wherein FIG. 3A is an explanatory diagram in the case of installing the projector in the normal installation manner, and FIG. 3B is an explanatory diagram in the case of installing the projector in the ceiling mount manner.

FIGS. 4A and 4B are explanatory diagrams in the case of installing the projector behind the screen, wherein FIG. 4A is an explanatory diagram in the case of installing the projector in the normal installation manner, and FIG. 4B is an explanatory diagram in the case of installing the projector in the ceiling mount manner.

FIGS. 5A and 5B are explanatory diagrams of the color shift in the projection screen of the projector, wherein FIG. 5A is a front view of the entire projection image displaying a lattice pattern, and FIG. 5B is an explanatory diagram showing a part of the projection image in an enlarged manner.

FIGS. 7A and 7B are explanatory diagrams showing a registration adjustment screen, wherein FIG. 7A is an explanatory diagram showing a normal adjustment state, and FIG. 7B is an explanatory diagram showing the adjustment state in the case in which the correction value becomes the maximum.

FIGS. 9A and 9B are explanatory diagrams of the registration adjustment screen in the case of the front projection, wherein FIG. 9A is an explanatory diagram in the case of installing the projector in the normal installation manner, and FIG. 9B is an explanatory diagram in the case of installing the projector in the ceiling mount manner.

FIGS. 10A and 10B are explanatory diagrams of the registration adjustment screen in the case of the rear projection, wherein FIG. 10A is an explanatory diagram in the case of installing the projector in the normal installation manner, and FIG. 10B is an explanatory diagram in the case of installing the projector in the ceiling mount manner.

DESCRIPTION OF EMBODIMENTS

Hereinafter, some embodiments of the invention will be explained.
First Embodiment In the first embodiment, a projector provided with a registration adjustment function, and displaying the correction direction (also referred to as a "registration correction direction") by the registration adjustment using an icon will be explained.

Figure 1:
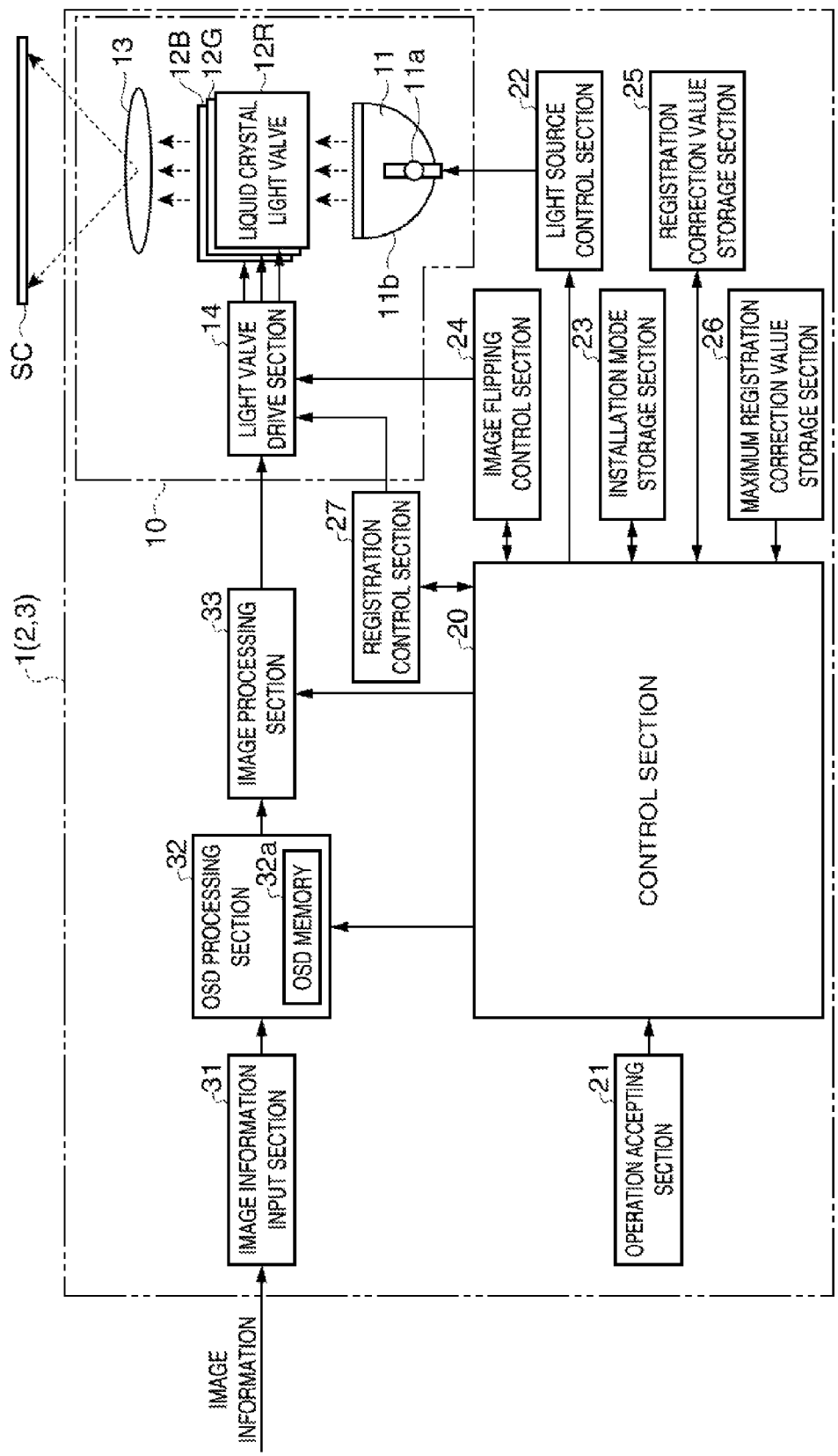
FIG. 1 is a block diagram showing a circuit configuration of a projector according to a first embodiment of the invention.

FIG. 1 is a block diagram showing a circuit configuration of the projector according to the first embodiment. As shown in FIG. 1, the projector 1 is configured including an image projection section 10, a control section 20, an operation accepting section 21, a light source control section 22, an installation mode storage section 23 as an installation posture storage section, an image flipping control section 24, a registration correction value storage section 25, a maximum registration correction value storage section 26 as a maximum correction amount storage section, a registration control section 27, an image information input section 31, an OSD processing section 32, an image processing section 33, and so on.

The image projection section 10 includes a light source 11, three liquid crystal light valves 12R, 12G, and 12B as a light modulating device, a projection lens 13 as a projection optical system, a light valve drive section 14, and so on. The image projection section 10 modulates the light emitted from the light source 11 with the liquid crystal light valves 12R, 12G, and 12B to thereby form image light, and then projects the image light through the projection lens 13 to thereby display it on a screen SC or the like.

The light source 11 is configured including a discharge light source lamp 11a consisting of, for example, a super-high pressure mercury lamp or a metal halide lamp, and a reflector 11b for reflecting the light, which is emitted by the light source lamp 11a, toward the liquid crystal light valves 12R, 12G, and 12B. The light emitted from the light source 11 is converted into the light having a roughly even luminance distribution by an integrator optical system not shown, and is separated into colored light components of red R, green G, and blue B, the three primary colors of light, by a color separation optical system not shown. The colored light components subsequently enter the liquid crystal light valves 12R, 12G, and 12B, respectively.

The liquid crystal light valves 12R, 12G, and 12B are each composed mainly of a liquid crystal panel having a liquid crystal material encapsulated between a pair of transparent substrates. The liquid crystal light valves 12R, 12G, and 12B are each provided with a plurality of pixels (not shown) arranged in a matrix, and arranged so that a drive voltage can be applied to the liquid crystal material pixel-by-pixel. When the light valve drive section 14 applies the drive voltages corresponding to image information input thereto to the respective pixels, the respective pixels are each set to have a light transmission rate corresponding to the image information. Therefore, the light emitted from the light source 11 is modulated while being transmitted through the liquid crystal light valves 12R, 12G, and 12B, thus the image corresponding to the image information is formed for each of the colored lights. The images of the respective colors are combined pixel-by-pixel by a color combining optical system, not shown, to thereby be formed as a color image, and then projected through the projection lens 13.

The control section 20 is provided with a central processing unit (CPU), a RAM used as a temporary storage for various data, a nonvolatile memory such as a mask ROM, a flash memory, or a ferroelectric RAM (FeRAM), and so on (neither of them is shown), and functions as a computer. The CPU operates along a control program stored in the nonvolatile memory, thus the control section 20 integrally controls the operation of the projector 1.

The operation accepting section 21 is for accepting an input operation of the user, and is provided with a plurality of operation keys for the user to provide various instructions to the projector 1. As the operation keys provided to the operation accepting section 21, there can be cited, for example, a power key for switching ON/OFF the power, an input switching key for switching between the image signals input, a menu key for switching display/nondisplay of the menu screen for performing a variety of settings, a cursor key used, for example, for moving the cursor in the menu screen, and a decision key for determining the variety of settings. When the user operates (holds down) the various operation keys of the operation accepting section 21, the operation accepting section 21 outputs an operation signal corresponding to the content of the operation by the user to the control section 20 in response to the input operation. It should be noted that it is also possible to adopt a configuration of using a remote controller (not shown) capable of a remote operation as the operation accepting section 21. In this case, the remote controller transmits an operation signal on an infrared ray or the like corresponding to the content of the operation by the user, and then the remote control signal receiving section not shown receives the operation signal and transmits it to the control section 20.

The light source control section 22 is provided with, for example, an inverter (not shown) for converting the direct current generated by a power supply circuit (not shown) into an alternating-current rectangular-wave current, and an igniter (not shown) for performing dielectric breakdown between the electrodes of the light source lamp $11a$ to thereby promote start-up of the light source lamp $11a$, and controls lighting of the light source 11 based on the instruction of the control section 20. Specifically, the light source control section 22 capable of starting the light source 11 and then supplying it with predetermined electrical power to thereby light the light source 11, and stopping the supply of the electrical power to thereby put the light source 11 off. Further, the light source control section 22 is capable of controlling the luminance (brightness) of the light source 11 by controlling the electric power supplied to the light source 11 based on the instruction by the control section 20.

The installation mode storage section 23 consists of a non-volatile memory, and stores the installation posture information of the main body of the projector 1 as the installation mode. As the installation mode, there is stored either one of a "front-normal installation posture" for installing the main body of the projector 1 in front of the screen SC with a basic posture, a "front-ceiling mount posture" for installing it in front of the screen SC upside down, a "rear-normal installation posture" for installing it behind the screen SC with the basic posture, and a "rear-ceiling mount posture" for installing it behind the screen SC with the ceiling mount posture. Writing and reading to and from the installation mode storage section 23 are performed by the control section 20. The control section 20 informs the image flipping control section 24 of the installation mode stored in the installation mode storage section 23.

The image flipping control section 24 makes the light valve drive section 14 perform vertical flipping and horizontal flipping of the image information input thereto based on the installation mode informed by the control section 20. If the installation mode is set to the "front-normal installation," the image flipping control section 24 issues an instruction to the light valve drive section 14 not to flip the image information. Further, if the installation mode is set to the "front-ceiling mount," the image flipping control section 24 issues an instruction to the light valve drive section 14 to flip the image information vertically and horizontally. Further, if the installation mode is set to the "rear-normal installation," the image flipping control section 24 issues an instruction to the light valve drive section 14 to flip the image information horizontally. Further, if the installation mode is set to the "rear-ceiling mount," the image flipping control section 24 issues an instruction to the light valve drive section 14 to flip the image information vertically.

Here, the installation posture of the projector 1 and the installation mode will be explained.

FIG. 2 is an explanatory diagram of an installation mode setting menu screen.

Figure 3A:
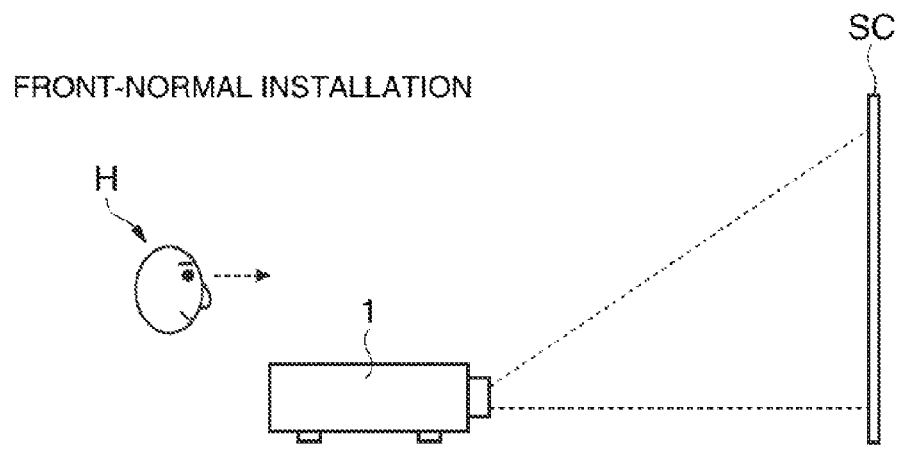
Figure 3B:
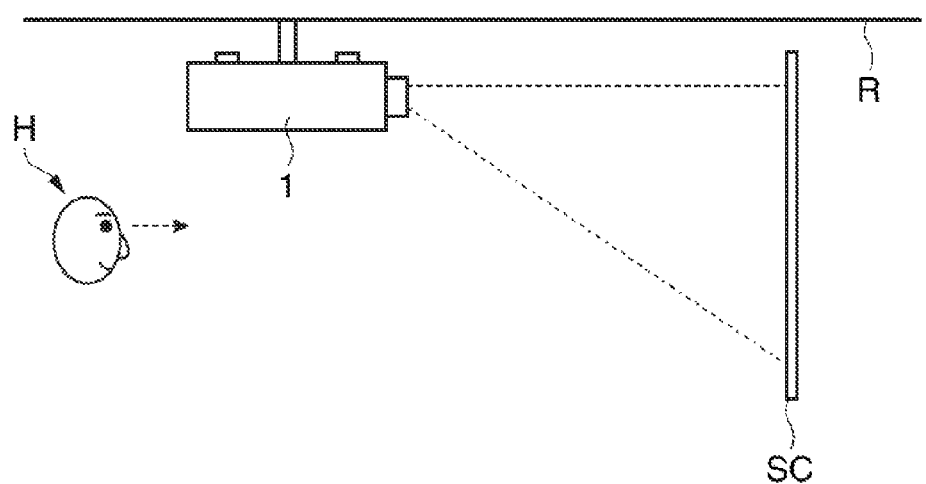
Figure 4A:
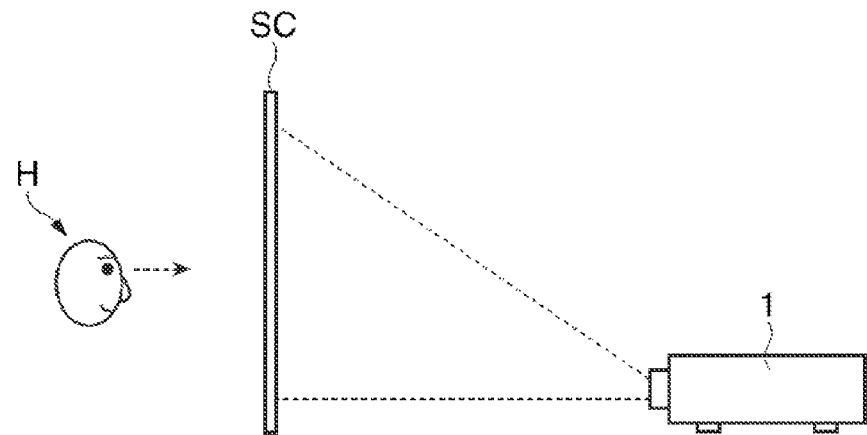
Figure 4B:
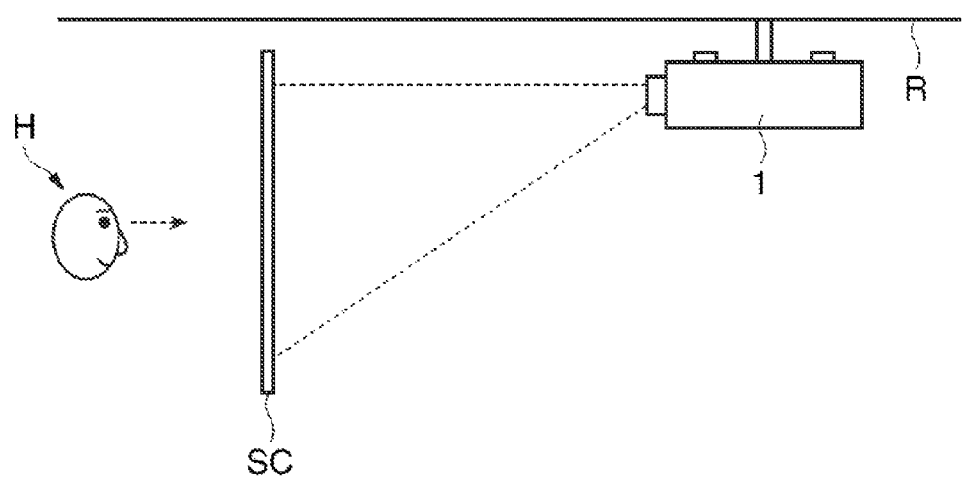

FIGS. 3A and 3B are explanatory diagrams in the case of installing the projector 1 in front of the screen SC, wherein FIG. 3A is an explanatory diagram in the case of installing the projector 1 in the normal installation manner, and FIG. 3B is an explanatory diagram in the case of installing the projector 1 in the ceiling mount manner. FIGS. 4A and 4B are explanatory diagrams in the case of installing the projector 1 behind the screen SC, wherein FIG. 4A is an explanatory diagram in the case of installing the projector 1 in the normal installation manner, and FIG. 4B is an explanatory diagram in the case of installing the projector 1 in the ceiling mount manner.

Firstly, setting of the installation mode will be explained.

The installation mode setting menu screen N1 is a menu screen for allowing the user to set the installation mode of the main body of the projector 1. The installation mode setting menu screen N1 is displayed in response to the user pressing the menu key provided to the operation accepting section 21, and performing a predetermined operation. In the present embodiment, the installation mode setting menu screen N1 is displayed as an on-screen display (OSD), and is displayed by the control section 20 instructing the OSD processing section 32 described later.

As shown in FIG. 2, in the uppermost part of the installation mode setting menu screen N1, there is displayed a character string of "INSTALLATION MODE SETTING" for indicating that it is the installation mode setting menu screen. On the lower side thereof, there is displayed a character string of "PLEASE SET INSTALLATION POSTURE OF PROJECTOR" for prompting setting of the installation mode. Further, at the center of the screen, there are displayed alternatives of "front-normal installation," "front-ceiling mount," "rear-normal installation," and "rear-ceiling mount." Further, in the lower part of the screen, there is displayed the explanation of the key input procedure.

If the user operates the operation accepting section 21 to select either one of the "front-normal installation," "front-ceiling mount," "rear-normal installation," and "rear-ceiling mount" on the screen, and then determine the selection using the decision key, the control section 20 writes the installation mode thus selected into the installation mode storage section 23 to thereby make the installation mode storage section 23 store the installation mode. It should be noted that it is assumed that the default installation mode is the "front-normal installation" in the present embodiment.

Then, the relationship between the installation posture and the installation mode will be explained.

The condition in which the projector 1 is installed in front of the screen SC with the normal installation posture, and the viewer H views the screen SC from the front thereof as shown in FIG. 3A is referred to as a front-normal installation condition. In this case, the image projected from the projector 1 and displayed on the screen SC is defined as a basic display image. In the front-normal installation condition, the viewer H can view the image, which is vertically and horizontally normal, if the user selects the "front-normal installation" in the installation mode setting menu screen N1.

The condition in which the projector 1 is installed in front of the screen SC with the ceiling mount posture (the posture in the case in which the projector 1 is suspended from the ceiling R upside down), and the viewer H views the screen SC from the front thereof as shown in FIG. 3B is referred to as a front-ceiling mount condition. In this case, the image projected from the projector 1 and displayed on the screen SC is flipped vertically (in the vertical direction) and horizontally (in the horizontal direction) with respect to the basic display image in the front-normal installation condition. Therefore, in order for the viewer H to view the normal image, it is required to also flip the image projected from the projector 1 vertically and horizontally. Therefore, in the front-ceiling mount condition, the user selects the "front-ceiling mount" in the installation mode setting menu screen N1. Thus, the light valve drive section 14 flips the image information vertically and horizontally in accordance with the instruction from the image flipping control section 24. Subsequently, the projector 1 performs the projection of the image light of the image information flipped vertically and horizontally, and the viewer H can view the vertically and horizontally normal image.

The condition in which the projector 1 is installed behind the screen SC with the normal installation posture, and the viewer H views the screen SC from the front thereof as shown in FIG. 4A is referred to as a rear-normal installation condition. In this case, the image projected from the projector 1 and displayed on the screen SC is flipped horizontally with respect to the basic display image in the front-normal installation condition. Therefore, in order for the viewer H to view the normal image, it is required to also flip the image projected from the projector 1 horizontally. Therefore, in the rear-normal installation condition, the user selects the "rear-normal installation" in the installation mode setting menu screen N1. Thus, the light valve drive section 14 flips the image information horizontally in accordance with the instruction from the image flipping control section 24. Subsequently, the projector 1 performs the projection of the image light of the image information flipped horizontally, and the viewer H can view the vertically and horizontally normal image.

The condition in which the projector 1 is installed behind the screen SC with the ceiling mount posture, and the viewer H views the screen SC from the front thereof as shown in FIG. 4B is referred to as a rear-ceiling mount condition. In this case, the image projected from the projector 1 and displayed on the screen SC is flipped vertically with respect to the basic display image in the front-normal installation condition. Therefore, in order for the viewer H to view the normal image, it is required to also flip the image projected from the projector 1 vertically. Therefore, in the rear-ceiling mount condition, the user selects the "rear-ceiling mount" in the installation mode setting menu screen N1. Thus, the light valve drive section 14 flips the image information vertically in accordance with the instruction from the image flipping control section 24. Subsequently, the projector 1 performs the projection of the image light of the image information flipped vertically, and the viewer H can view the vertically and horizontally normal image.

Going back to FIG. 1, the registration correction value storage section 25 consists of a nonvolatile memory, and stores the registration correction amount of the projector 1 as a numerical value. The registration correction value (also referred to simply as a "correction value") is a correction value for electrically reducing the color shift caused by the displacement between the colored lights, namely the red light R, the green light G, and the blue light B, in the image projected on the screen SC. In the present embodiment, the correction values in the horizontal direction and the correction value in the vertical direction in the liquid crystal light valves 12R, 12G, and 12B are stored. Specifically, the registration correction value storage section 25 stores the G-R correction value as the correction value of the red light R with respect to the green light G and the correction direction thereof, and the G-B correction value as the correction value of the blue light B with respect to the green light G and the correction direction thereof.

The correction values and the correction directions displayed in the registration adjustment screen described later are read out by the control section 20 from the registration correction value storage section 25, informed to the OSD processing section 32 and displayed. Further, if the user changes the correction values on the registration adjustment screen, the control section 20 writes the correction values thus changed to the registration correction value storage section 25.

The maximum registration correction value storage section 26 consists of a nonvolatile memory, and stores the maximum correctable amount of the registration as a numerical value (hereinafter referred to as a "maximum correction value"). Specifically, the maximum correction value of the G-R correction value and the maximum correction value of the G-B correction value are stored for each of the horizontal direction and the vertical direction. In the present embodiment, either of the maximum correction values is set to "20." The control section 20 performs the reading of the maximum correction values from the maximum registration correction value storage section 26.

The registration control section 27 makes the light valve drive section 14 perform the registration correction (adjustment) of the image information input thereto based on the registration correction values informed by the control section 20. The control section 20 informs the registration control section 27 of the registration correction values stored in the registration correction value storage section 25. The registration control section 27 makes the light valve drive section 14 perform the registration correction (adjustment) based on the G-R correction values and the G-B correction values of the registration in the horizontal direction and the vertical direction. The registration control section 27 and the light valve drive section 14 on this occasion correspond to a registration adjustment section. It should be noted that it is assumed that a known method is used as the method of the registration correction (adjustment) (see, e.g., Japanese Patent Publication No. 8-201937).

Here, the registration adjustment (also referred to as the registration correction) will be explained.

Figure 5A:
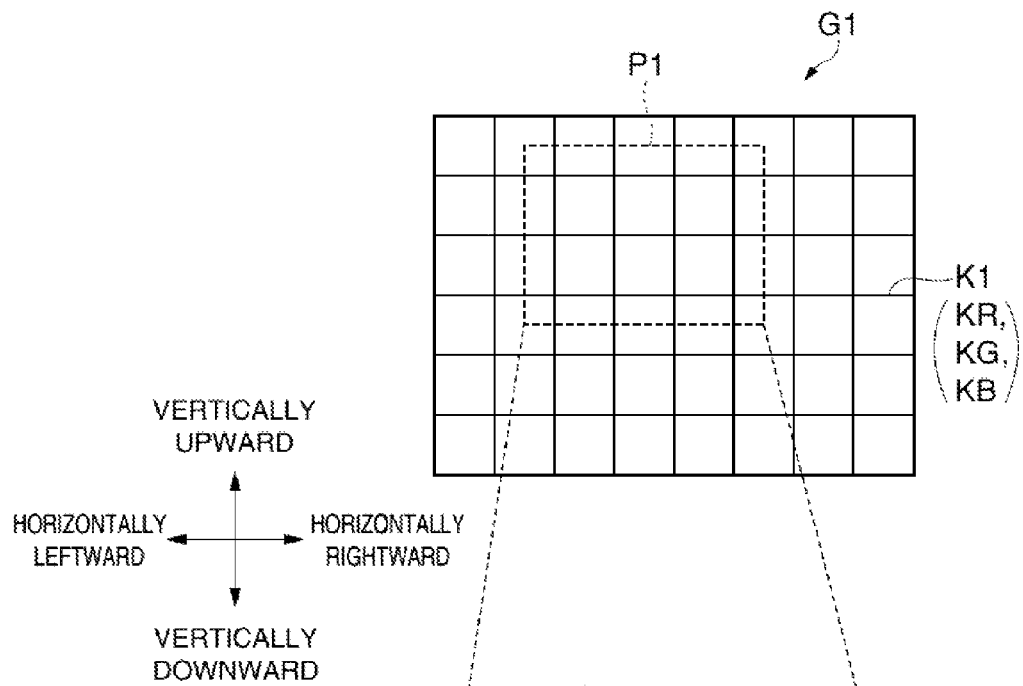
Figure 5B:
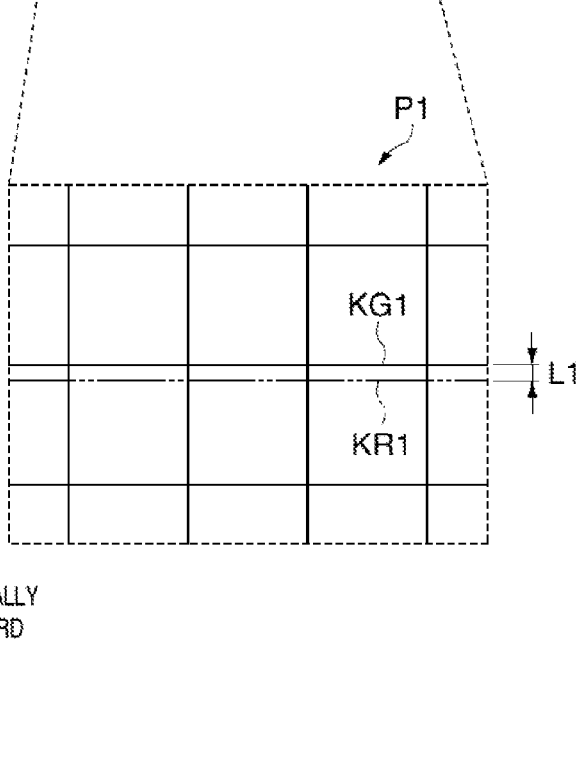

FIGS. 5A and 5B are explanatory diagrams of the color shift in the projection screen of the projector 1, wherein FIG. 5A is a front view of the entire projection image displaying a lattice pattern, and FIG. 5B is an explanatory diagram showing a part of the projection image in an enlarged manner.

As shown in FIG. 5A, a plurality of ruled lines K1 is displayed in the projection image G1 in the horizontal direction and the vertical direction so as to form a lattice pattern. The ruled lines K1 are each composed of the red light KR, the green light KG, and the blue light KB combined with each other. FIG. 5B shows a partial image P1 of the projection image G1 in an enlarged manner. Here, the lateral ruled line in the horizontal direction at the center of the partial image P1 is in a state in which the red light KR1 is displaced as much as L1 downward in the vertical direction with respect to the green light KG1. In the case in which the displacement (the color shift) occurs in such a manner, the user corrects (adjusts) the red light KR1 so as to move as much as L1 upward in the vertical direction using the registration adjustment function. The explanation of the screen of the registration adjustment will be described later. It should be noted that although in the present embodiment the displacement in the vertical direction is explained, the displacement may occur in the horizontal direction in some cases. Further, there are some cases in which the blue light KB is displaced with respect to the green light KG.

Going back to FIG. 1, the image information input section 31 is provided with a variety of types of input terminals (not shown) for connection with external image supply devices (not shown) such as a personal computer, video playback device, a memory card, a USB storage, or a digital camera via cables, and the image information (image signal) is input from the image supply devices. The image information input section 31 converts the image information thus input into image information with the format, which can be processed by the OSD processing section 32, and then outputs the image information to the OSD processing section 32.

Based on the instruction of the control section 20, the OSD processing section 32 performs processing for superimposing an OSD image such as a menu image or a message image on the input image. The OSD processing section 32 is provided with an OSD memory 32a, and stores the image data representing figures, a font, and so on for forming the OSD image.

In the present embodiment, the OSD memory 32a stores the image data such as the installation mode setting menu screen N1, a registration adjustment color selection screen described later, and the ruled lines, icons for indicating the correction direction, and a numerical font for expressing the correction values in the registration adjustment screen.

When the control section 20 instructs the superimpose of the OSD image, the OSD processing section 32 reads out the necessary image data from the OSD memory 32a, and then generates the OSD image information for forming the OSD image designated. Subsequently, the OSD processing section 32 combines the OSD image information with the image information input from the image information input section 31 so that the OSD image is superimposed at a predetermined position on the input image. The image information combined with the OSD image information is then output to the image processing section 33. It should be noted that in absence of the instruction to superimpose the OSD image from the control section 20, the OSD processing section 32 outputs the image information input from the image information input section 31 directly to the image processing section 33.

Here, the screen of the registration adjustment will be explained.

Figure 6:
FIG. 6 is an explanatory diagram showing a registration adjustment color selection screen.

FIG. 6 is an explanatory diagram showing a registration adjustment color selection screen. The registration adjustment color selection screen N2 is displayed in response to the user pressing the menu key provided to the operation accepting section 21, and performing a predetermined operation.

As shown in FIG. 6, in the uppermost part of the registration adjustment color selection screen N2, there is displayed a character string of "REGISTRATION ADJUSTMENT COLOR SELECTION" for indicating that it is the registration adjustment color selection screen. On the lower side thereof, there is displayed a character string of "PLEASE SELECT COLOR SUBJECT TO REGISTRATION ADJUSTMENT" for prompting selection of the color to be adjusted. Further, at the center of the screen, there are displayed alternatives of "G-R" to be selected when adjusting the G-R correction value, and "G-B" to be selected when adjusting the G-B correction value. Further, in the lower part of the screen, there is displayed the explanation of the key input procedure.

When the user operates the operation accepting section 21 to select either one of the "G-R" and the "G-B" on the registration adjustment color selection screen N2, and then determines it using the decision key, the control section 20 issues an instruction to the OSD processing section 32 to display the registration adjustment screen for performing the color shift correction of the colored light thus selected.

Figure 7A:
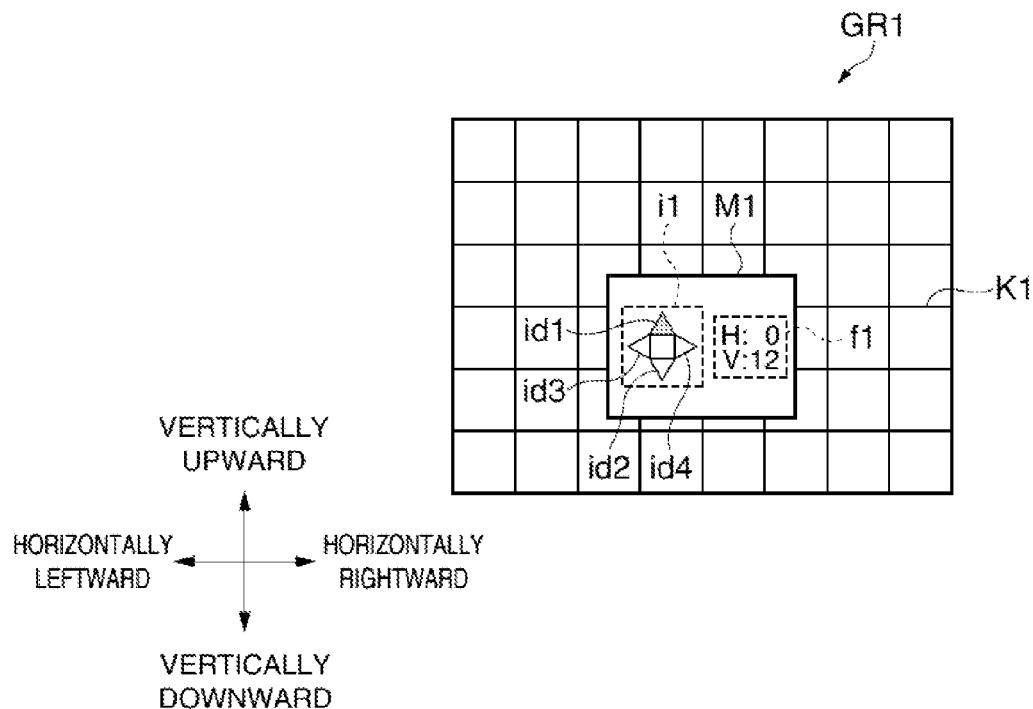
Figure 7B:
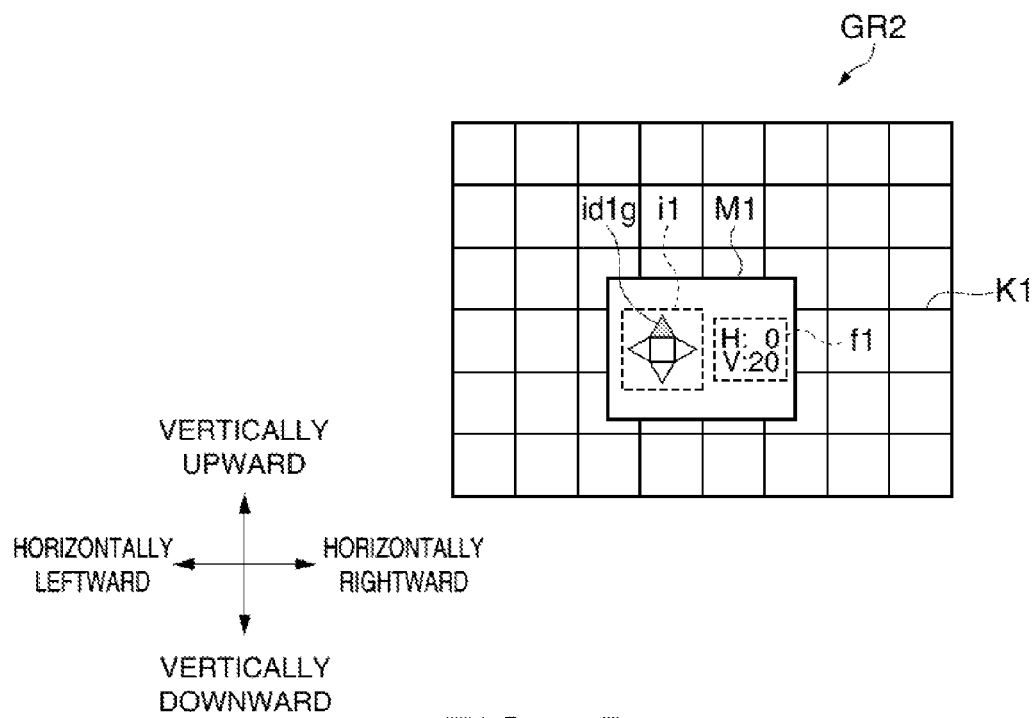

FIGS. 7A and 7B are explanatory diagrams showing the registration adjustment screen, wherein FIG. 7A is an explanatory diagram showing a normal adjustment state, and FIG. 7B is an explanatory diagram showing the adjustment state in the case in which the correction value becomes the maximum. As shown in FIG. 7A, a plurality of ruled lines K1 is displayed in the registration adjustment screen GR1 in the horizontal direction and the vertical direction so as to form a lattice pattern similarly to the projection image G1.

Further, in roughly lower center of the registration adjustment screen GR1, there is displayed a state display menu section M1 showing the adjustment state (the correction state). In the left part of the state display menu section M1, there is displayed an icon section i1 for indicating the registration correction direction. Here, the icon section i1 is composed of a triangle icon id1 pointing upward in the vertical direction, a triangle icon id2 pointing downward in the vertical direction, a triangle icon id3 pointing to the left in the horizontal direction, and a triangle icon id4 pointing to the right in the horizontal direction. Further, the triangle icon portion pointing the correction direction is filled with the color representing the colored light subject to the present correction. In the present registration adjustment screen GR1, the triangle icon id1 indicating the upper side in the vertical direction is filled with red representing the red light. The OSD processing section 32 for generating the registration adjustment screen GR1 for indicating the correction direction with the icon section i1 as described above corresponds to a correction direction display control section.

Further, in the right part of the state display menu section M1, there are displayed the G-R correction values or the G-B correction values subject to the present correction stored in the registration correction value storage section 25 as a registration correction value display section fl. The registration correction value in the horizontal direction is expressed as the symbol "H:" and the numerical value thereof, and the registration correction value in the vertical direction is expressed as the symbol "V:" and the numerical value thereof.

Further, if the registration correction value is equal to the maximum correction value "20" stored in the maximum registration correction value storage section 26, the control section 20 issues an instruction to the OSD processing section 32 to change the triangle icon id1 for pointing the correction direction to the triangle icon id1g with a predetermined color (e.g., gray) different from the color representing the colored light subject to the present correction as shown in FIG. 7B.

Going back to FIG. 1, the image processing section 33 converts the image information input from the OSD processing section 32 into the image information representing the grayscales of respective pixels of the liquid crystal light valves 12R, 12G, and 12B. Here, the image information thus obtained by the conversion is separated so as to correspond to the colored lights of R, G, and B, and is constituted with a plurality of pixel values corresponding respectively to all of the pixels of the liquid crystal light valves 12R, 12G, and 12B. The pixel value is for determining the light transmission of the corresponding pixel, and defines the intensity (grayscale) of the light emitted from the pixel. Further, the image processing section 33 performs an image quality adjustment process for adjusting, for example, brightness, contrast, sharpness, and color on the image information thus converted, and then outputs the image information thus processed to the light valve drive section 14 based on the instruction of the control section 20.

When the light valve drive section 14 performs the conversion (correction) on the image information input from the image processing section 33 in accordance with the instruction from the image flipping control section 24 and the registration control section 27, and then drives the liquid crystal light valves 12R, 12G, and 12B in accordance with the image information thus converted, the liquid crystal light valves 12R, 12G, and 12B form the images corresponding to the image information, and the images are projected through the projection lens 13.

Figure 8:
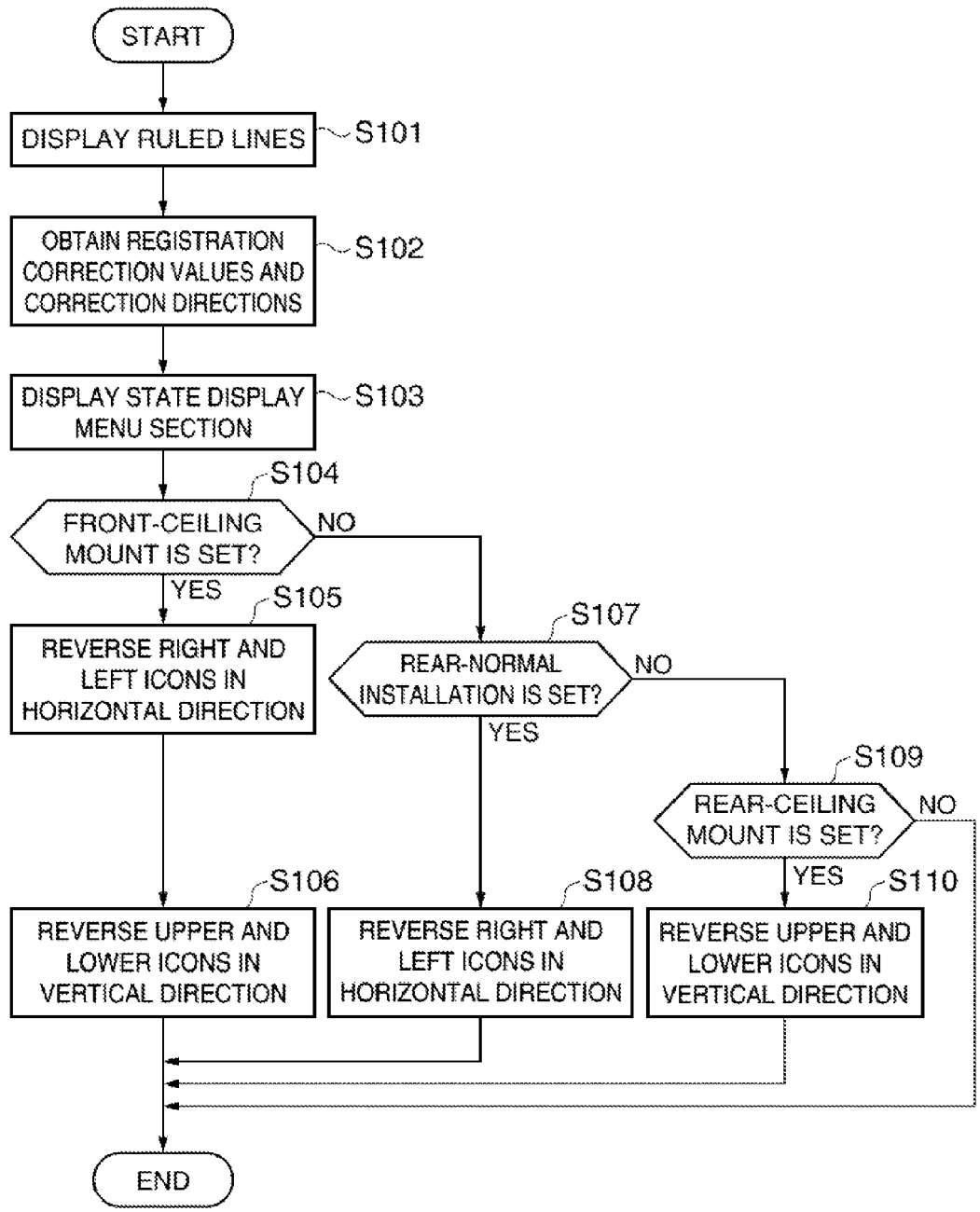
FIG. 8 is a flowchart of an icon orientation conversion process.

Then, the operation of the projector 1 for changing the icon section i1 of the registration adjustment screen based on the installation mode will be explained. The projector 1 performs an icon orientation conversion process when starting the display of the registration adjustment screen (GR1, GR2) described above. FIG. 8 is a flowchart of an icon orientation conversion process.

When selecting the "G-R" or the "G-B" and determining it using the decision key in the registration adjustment color selection screen N2, the control section 20 issues an instruction to the OSD processing section 32 to display the ruled lines K1 (step S101). Subsequently, the control section 20 obtains (step S102) the registration correction value and the correction direction stored in the registration correction storage section 25 based on the colored light thus selected. Then, the control section 20 issues an instruction to the OSD processing section 32 to display (step S103) the state display menu M1. Specifically, the control section 20 makes the OSD processing section 32 display the icon section i1 and the registration correction value display section f1 based on the registration correction value and the correction direction.

The control section 20 reads out the installation mode stored in the installation mode storage section 23, and then determines (step S104) whether or not the "front-ceiling mount" is set. If the "front-ceiling mount" is set (YES in the step S104), the control section 20 issues an instruction to the OSD processing section 32 to reverse (flip) (step S105) the left triangle icon and the right triangle icon of the icon section i1 in the horizontal direction. Further, the control section 20 issues an instruction to the OSD processing section 32 to reverse (step S106) the upper triangle icon and the lower triangle icon of the icon section i1 in the vertical direction. Then, the icon orientation conversion process is terminated.

If the "front-ceiling mount" is not set (NO in the step S104), the control section 20 determines whether or not the installation mode is set to the "rear-normal installation" (step S107). If the "rear-normal installation" is set (YES in the step S107), the control section 20 issues an instruction to the OSD processing section 32 to reverse (step S108) the left triangle icon and the right triangle icon of the icon section i1 in the horizontal direction. Then, the icon orientation conversion process is terminated.

If the "rear-normal installation" is not set (NO in the step S107), the control section 20 determines whether or not the installation mode is set to the "rear-ceiling mount" (step S109). If the "rear-ceiling mount" is set (YES in the step S109), the control section 20 issues an instruction to the OSD processing section 32 to reverse (step S110) the upper triangle icon and the lower triangle icon of the icon section i1 in the vertical direction. Then, the icon orientation conversion process is terminated.

If the "rear-ceiling mount" is not set (NO in the step S109), the control section 20 terminates the icon orientation conversion process without reversing the triangle icons.

Here, the registration adjustment screen in the case in which the projector 1 performs the icon orientation conversion process will be explained.

Figure 9A:
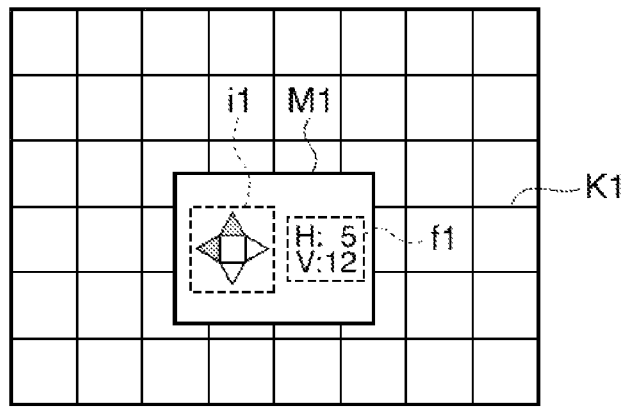
Figure 9B:
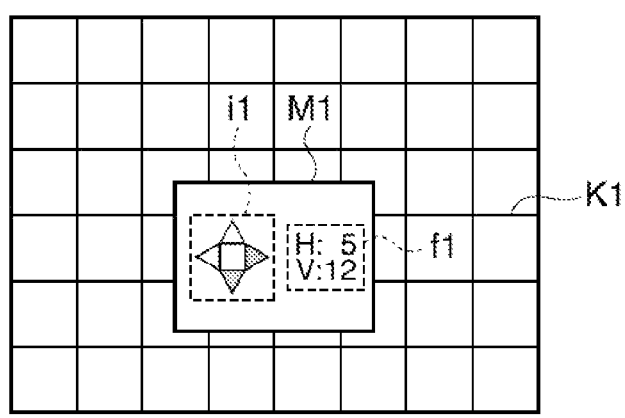
Figure 10A:
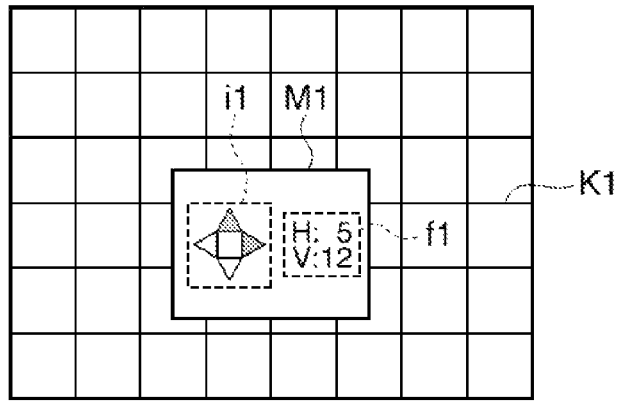
Figure 10B:
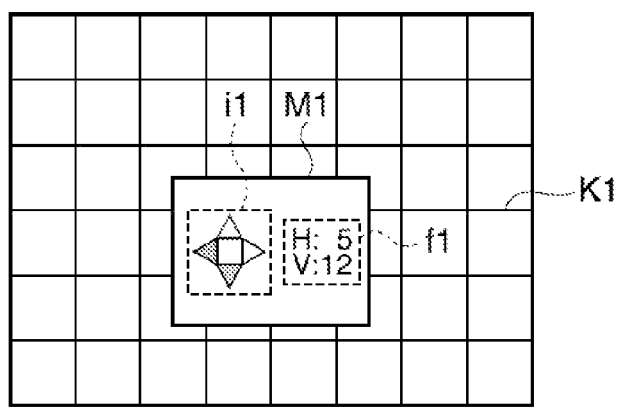

FIGS. 9A and 9B are explanatory diagrams of the registration adjustment screen in the case of the front projection, wherein FIG. 9A is an explanatory diagram in the case of installing the projector 1 in the normal installation manner, and FIG. 9B is an explanatory diagram in the case of installing the projector 1 in the ceiling mount manner. FIGS. 10A and 10B are explanatory diagrams of the registration adjustment screen in the case of the rear projection, wherein FIG. 10A is an explanatory diagram in the case of installing the projector 1 in the normal installation manner, and FIG. 10B is an explanatory diagram in the case of installing the projector 1 in the ceiling mount manner.

FIG. 9A shows the registration adjustment screen GR3 generated by the OSD processing section 32 in the case in which the installation mode is set to the "front-normal installation." It is assumed in the registration adjustment screen GR3 that the triangle icons of the icon section i1 indicate to the left in the horizontal direction and upward in the vertical direction, the correction value in the horizontal direction is "5," and the correction value in the vertical direction is "12."

Here, FIG. 9B shows the registration adjustment screen GR4 in the case in which the installation mode is set to the "front-ceiling mount." It is assumed in the registration adjustment screen GR4 that the triangle icons of the icon section i1 indicate to the right in the horizontal direction and downward in the vertical direction, the correction value in the horizontal direction is "5," and the correction value in the vertical direction is "12."

Further, FIG. 10A shows the registration adjustment screen GR5 in the case in which the installation mode is set to the "rear-normal installation." It is assumed in the registration adjustment screen GR5 that the triangle icons of the icon section i1 indicate to the right in the horizontal direction and upward in the vertical direction, the correction value in the horizontal direction is "5," and the correction value in the vertical direction is "12."

Further, FIG. 10B shows the registration adjustment screen GR6 in the case in which the installation mode is set to the "rear-ceiling mount." It is assumed in the registration adjustment screen GR6 that the triangle icons of the icon section i1 indicate to the left in the horizontal direction and downward in the vertical direction, the correction value in the horizontal direction is "5," and the correction value in the vertical direction is "12."

As described above, in the registration adjustment screen, the triangle icons of the icon section i1 are reversed in the horizontal direction and the vertical direction if the installation mode is set to the "front-ceiling mount," the triangle icons of the icon section i1 are reversed in the horizontal direction if the installation mode is set to the "rear-normal installation," the triangle icons of the icon section i1 are reversed in the vertical direction if the installation mode is set to the "rear-ceiling mount," and the triangle icons of the icon section i1 are not reversed if the installation mode is set to the "front-normal installation."

According to the first embodiment described above, the following advantages can be obtained.

1. The projector 1 displays the correction direction using the triangle icons in the registration adjustment screen. Then, the OSD processing section 32 of the projector 1 reverses the triangle icons indicating the correction direction in the horizontal direction and the vertical direction when generating the registration adjustment screen if the installation mode is the "front-ceiling mount." Thus, when the image is flipped in the light valve drive section 14 in accordance with the installation mode, the registration correction direction is displayed correctly. In other words, the correct correction direction is displayed with the hardware (the optical mechanism). Similarly, by reversing the triangle icons in the horizontal direction if the "rear-normal installation" is set, and reversing the triangle icons in the vertical direction if the "rear-ceiling mount" is set, the registration correction direction is correctly displayed even in the case in which the image is flipped in the horizontal direction and the vertical direction by the light valve drive section 14. In other words, the registration correction direction is correctly displayed in the projection screen using the triangle icons irrespective of the installation condition of the projector. Further, the correction direction viewed from the user and the actual correction direction coincide with each other in the registration adjustment screen. Therefore, the operability can be prevented from being degraded when performing the registration adjustment.

2. In the projector 1, the color of the triangle icon of the icon section i1, on which the correction is performed, is provided with the color corresponding to the colored light subject to the present correction in the registration adjustment screen. Thus, it becomes easy for the user to identify the colored light subject to the present displacement correction.

3. The projector 1 changes the color of the triangle icon to a predetermined color (e.g., gray) in the registration adjustment screen if the correction value becomes the maximum. Thus, it becomes easy for the user to recognize that the maximum correction value is reached.

Second Embodiment

As a second embodiment, a projector displaying the registration correction values and the maximum correction values in the registration adjustment screen will be explained.

The circuit configuration of the projector 2 according to the second embodiment is substantially the same as that of the first embodiment shown in FIG. 1. It should be noted that they are different from each other in a part of the registration adjustment screen generated by the OSD processing section 32.

Figure 11:
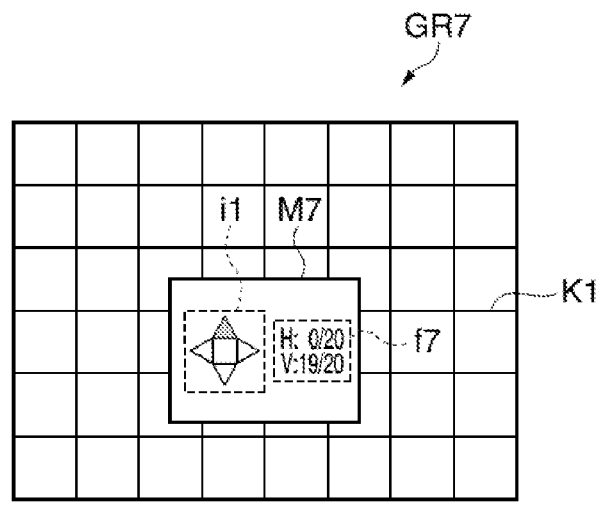
FIG. 11 is an explanatory diagram showing the registration adjustment screen of the projector according to a second embodiment of the invention.

FIG. 11 is an explanatory diagram showing the registration adjustment screen of the projector 2 according to the second embodiment. As shown in FIG. 11, a registration adjustment screen GR7 is different from the registration adjustment screen GR1 shown in FIG. 7A in a manner of displaying the registration correction value display section. The other part of the display is the same.

In the right part of a state display menu section M7, there is displayed a registration correction value display section f7. The display of the registration correction value in the horizontal direction in the registration correction value display section f7 is expressed by the symbol "H:," the numerical value thereof, the symbol "/," and the maximum correction value. Further, the display of the registration correction value in the vertical direction in the registration correction value display section f7 is expressed by the symbol "V:," the numerical value thereof, the symbol "/," and the maximum correction value. Here, the maximum correction value denotes the maximum correction value stored in the maximum registration correction value storage section 26. In the present embodiment, the maximum correction value is set to "20" similarly to the first embodiment. It should be noted that the OSD processing section 32 on this occasion corresponds to a correction amount display control section.

According to the second embodiment described above, the following advantage can be obtained.

1. According to the projector 2, the user can compare the present registration correction value and the maximum correction value with each other using numerical characters when performing the registration adjustment. Therefore, it is possible for the user to easily figure out the present degree of the correction.

Third Embodiment

As a third embodiment, a projector displaying the proportion between the registration correction value and the maximum correction value using the icon in the registration adjustment screen will be explained.

The circuit configuration of the projector 3 according to the third embodiment is substantially the same as that of the first embodiment shown in FIG. 1. It should be noted that they are different from each other in a part of the registration adjustment screen generated by the OSD processing section 32.

Figure 12:
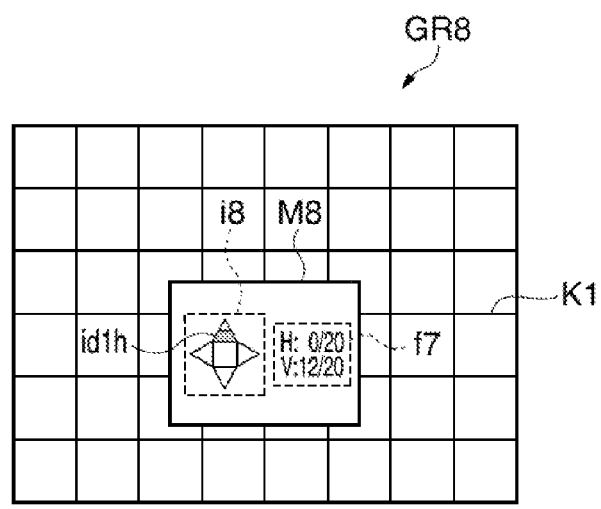
FIG. 12 is an explanatory diagram showing the registration adjustment screen of the projector according to a third embodiment of the invention.

FIG. 12 is an explanatory diagram showing the registration adjustment screen of the projector 3 according to the third embodiment. As shown in FIG. 12, a registration adjustment screen GR8 is different from the registration adjustment screen GR7 of the second embodiment shown in FIG. 11 in a manner of displaying the icon section. The other part of the display is the same.

In the left part of a state display menu section M8, there is displayed an icon section i8. It is assumed that the area of the entire triangle icon id1$h$ indicating the correction direction in the icon section i8 represents the maximum correction value, and the area of the region filled and located on the bottom side (the center side of the icon section i8) of the triangle icon id1$h$ represents the registration correction value used in the present correction. In other words, the ratio between the area of the entire region of the triangle icon id1$h$ and the area of the region filled and located on the bottom side represents the ration between the maximum correction value and the registration correction value used in the present correction. Here, the maximum correction value denotes the maximum correction value stored in the maximum registration correction value storage section 26. In the present embodiment, the maximum correction value is set to "20" similarly to the first embodiment.

According to the third embodiment described above, the following advantage can be obtained.

1. According to the projector 3, the user can compare the registration correction value and the maximum correction value with each other based on the state of separation by painting with the colors in the triangle icon when performing the registration adjustment. Therefore, it is possible for the user to easily figure out the degree of the present registration correction amount.

It should be noted that the invention is not limited to the embodiments described above, but can be put into practice with various modifications or improvements. Some modified examples will be described below.

FIRST MODIFIED EXAMPLE

Although in the embodiments described above the registration correction value storage section 25 stores the registration correction amounts of the projectors 1, 2, or 3 as the G-R correction value, which is the correction value of the red light R with respect to the green light G, and the G-B correction value, which is the correction value of the blue light B with respect to the green light G, it is also possible to store the correction values of the red light R, the green light G, and the blue light B separately. On this occasion, in the registration adjustment color selection screen, the colored light on which the registration adjustment is performed is selected from the colored lights R, G, and B, and then the correction is performed for each of the colored lights using the registration adjustment screen.

SECOND MODIFIED EXAMPLE

Although in the embodiments described above, the light source 11 is configured with the discharge light source lamp 11$a$, a sold-state light source such as a light emitting diode (LED) light source or a laser, or other light sources can also be used therefor.

THIRD MODIFIED EXAMPLE

Although in the embodiments described above the transmissive liquid crystal light valves 12R, 12G, and 12B are used as the light modulation devices, it is also possible to use reflective light modulation devices such as reflective liquid crystal light valves.

What is claimed is:

1. A projector comprising:
   a light source;
   a light modulation device configured to modulate a light emitted from the light source in accordance with an image signal for each of colored lights for color display;
   a projection optical system configured to project each of the colored lights modulated by the light modulation device;

an operation accepting section configured to accept an operation;

a registration adjustment section configured to perform correction of the image signal corresponding to each of the colored lights based on the operation accepted by the operation accepting section so that a displacement occurring in at least one of a horizontal direction and a vertical direction in a projection screen between the colored lights is reduced, and supply the light modulation device with the image signal corrected if the displacement occurs;

a correction direction display control section configured to display a correction direction, in which the correction of the image signal by the registration adjustment section is performed, in the projection screen as an icon indicating a direction; and a maximum correction amount storage section configured to store a maximum correction amount as a largest correction amount by the registration adjustment section, wherein a color of the icon indicating the correction direction displayed by the correction direction display control section is a color corresponding to a color represented by the image signal on which the correction is performed, and the correction direction display section changes the color of the icon to a predetermined color if the correction amount by the registration adjustment section becomes the maximum correction amount.

2. The projector according to claim 1, further comprising:
an installation posture storage section configured to store, as installation posture information of a main body of the projector, information of either one of a front projection posture of performing projection from a front side, from which the projection screen is viewed, to a screen and a rear projection posture of performing projection from a rear side opposite to the front side to the screen, and information of either one of a normal installation posture corresponding to a predetermined basic posture of installation and a ceiling mount posture with upside down, wherein the correction direction display control section reverses the direction indicated by the icon in a horizontal direction and a vertical direction if the installation posture information stored in the installation posture storage section corresponds to the front projection posture and the ceiling mount posture, reverses the direction indicated by the icon in the horizontal direction if the installation posture information corresponds to the rear projection posture and the normal installation posture, and reverses the direction indicated by the icon in the vertical direction if the installation posture information corresponds to the rear projection posture and the ceiling mount posture.

3. The projector according to claim 1, further comprising:
a correction amount display control section configured to display the correction amount by the registration adjustment section and the maximum correction amount in the projection screen with a numerical character.

4. The projector according to claim 1, wherein
the correction direction display control section separates the icon by painting with a color corresponding to the color represented by the image signal on which the correction is performed and another color in accordance with a ratio between the correction amount and the maximum correction amount.

5. A method of controlling a projector, comprising:
providing a light source, a light modulation device configured to modulate a light emitted from the light source in accordance with an image signal for each of colored lights for color display, a projection optical system configured to project the colored lights modulated by the light modulation device, and an operation accepting section configured to accept an operation to the projector;

adjusting registration by performing correction of the image signal corresponding to each of the colored lights based on the operation accepted by the operation accepting section so that a displacement occurring in at least one of a horizontal direction and a vertical direction in a projection screen between the colored lights is reduced, and supplying the light modulation device with the image signal corrected if the displacement occurs;

displaying a correction direction, in which the correction of the image signal is performed in the adjusting, in the projection screen as an icon indicating a direction, a color of the icon indicating the correction direction is a color corresponding to a color represented by the image signal on which the correction is performed;

storing a maximum correction amount as a largest correction amount by the registration adjustment section; and changing the color of the icon to a predetermined color if the correction amount by the registration adjustment section becomes the maximum correction amount.

6. The method according to claim 5, further comprising:
storing, as installation posture information of a main body of the projector, information of either one of a front projection posture of performing projection from a front side, from which the projection screen is viewed, to a screen and a rear projection posture of performing projection from a rear side opposite to the front side to the screen, and information of either one of a normal installation posture corresponding to a predetermined basic posture of installation and a ceiling mount posture with upside down, and reversing the direction indicated by the icon in a horizontal direction and a vertical direction if the installation posture information stored in the installation posture storage section corresponds to the front projection posture and the ceiling mount posture, or in the horizontal direction if the installation posture information corresponds to the rear projection posture and the normal installation posture, or in the vertical direction if the installation posture information corresponds to the rear projection posture and the ceiling mount posture.

7. The method according to claim 5, further comprising:
displaying the correction amount and the maximum correction amount in the projection screen with a numerical character.

8. The method according to claim 5, wherein
the icon is separated by painting with a color corresponding to the color represented by the image signal on which the correction is performed and another color in accordance with a ratio between the correction amount and the maximum correction amount.

* * * * *